United States Patent
Ledentsov et al.

(10) Patent No.: US 12,554,886 B2
(45) Date of Patent: Feb. 17, 2026

(54) COMPUTER-IMPLEMENTED METHOD AND SYSTEM TO GOVERN STATUS CHECK OF AT LEAST ONE HYPERLINK IN PRESERVATION OF USER'S ANONYMITY OF THE ACCESSED HYPERLINK

(71) Applicant: Siemens Aktiengesellschaft, Munich (DE)

(72) Inventors: Dmitry Ledentsov, Munich (DE); Bernd Lindner, Kirchheim (DE)

(73) Assignee: Siemens Aktiengesellschaft, Munich (DE)

( * ) Notice: Subject to any disclaimer, the term of this patent is extended or adjusted under 35 U.S.C. 154(b) by 261 days.

(21) Appl. No.: 18/101,734

(22) Filed: Jan. 26, 2023

(65) Prior Publication Data
US 2024/0256705 A1    Aug. 1, 2024

(51) Int. Cl.
*G06F 21/62* (2013.01)

(52) U.S. Cl.
CPC .................. *G06F 21/6254* (2013.01)

(58) Field of Classification Search
CPC .................................. G06F 21/6254
See application file for complete search history.

(56) References Cited

U.S. PATENT DOCUMENTS

| | | | | |
|---|---|---|---|---|
| 6,389,436 B1 * | 5/2002 | Chakrabarti | .......... | G06F 16/382 707/E17.097 |
| 8,543,901 B1 * | 9/2013 | Diwan | ................ | G06F 16/9566 715/208 |
| 2009/0216724 A1 * | 8/2009 | Cai | ........................ | G06F 16/954 |

OTHER PUBLICATIONS https://en.wikipedia.org/wiki/Quotient_filter.
https://github.com/raviqqe/muffet.
https://en.wikipedia.org/wiki/Internet_bot.
https://en.wikipedia.org/wiki/Cuckoo_filter.
https://en.wikipedia.org/wiki/Bloom_filter.
https://github.com/raviqqe/liche.

* cited by examiner

*Primary Examiner* — Lynn D Feild
*Assistant Examiner* — Vladimir I Gavrilenko
(74) *Attorney, Agent, or Firm* — Schmeiser, Olsen & Watts, LLP

(57) ABSTRACT

The present invention relates to a computer-implemented method and to a system to govern status check of at least one hyperlink in preservation of user's anonymity of the accessed hyperlink, comprising the following method steps: Providing probabilistic data structure storage, where at least one generated first fingerprint of a hyperlink referring to a WEB object accessed by at least one user is stored, whereby each fingerprint is associated with a status ascertained by the user access, Requesting a status check of at least one hyperlink; Generating a second fingerprint of each hyperlink requested for the status check, matching such a second fingerprint against the at least one first fingerprint, if the matching is successful then the status results in functioning, otherwise the status results in broken or as unknown functioning, and returning the status on an output device.

4 Claims, 1 Drawing Sheet

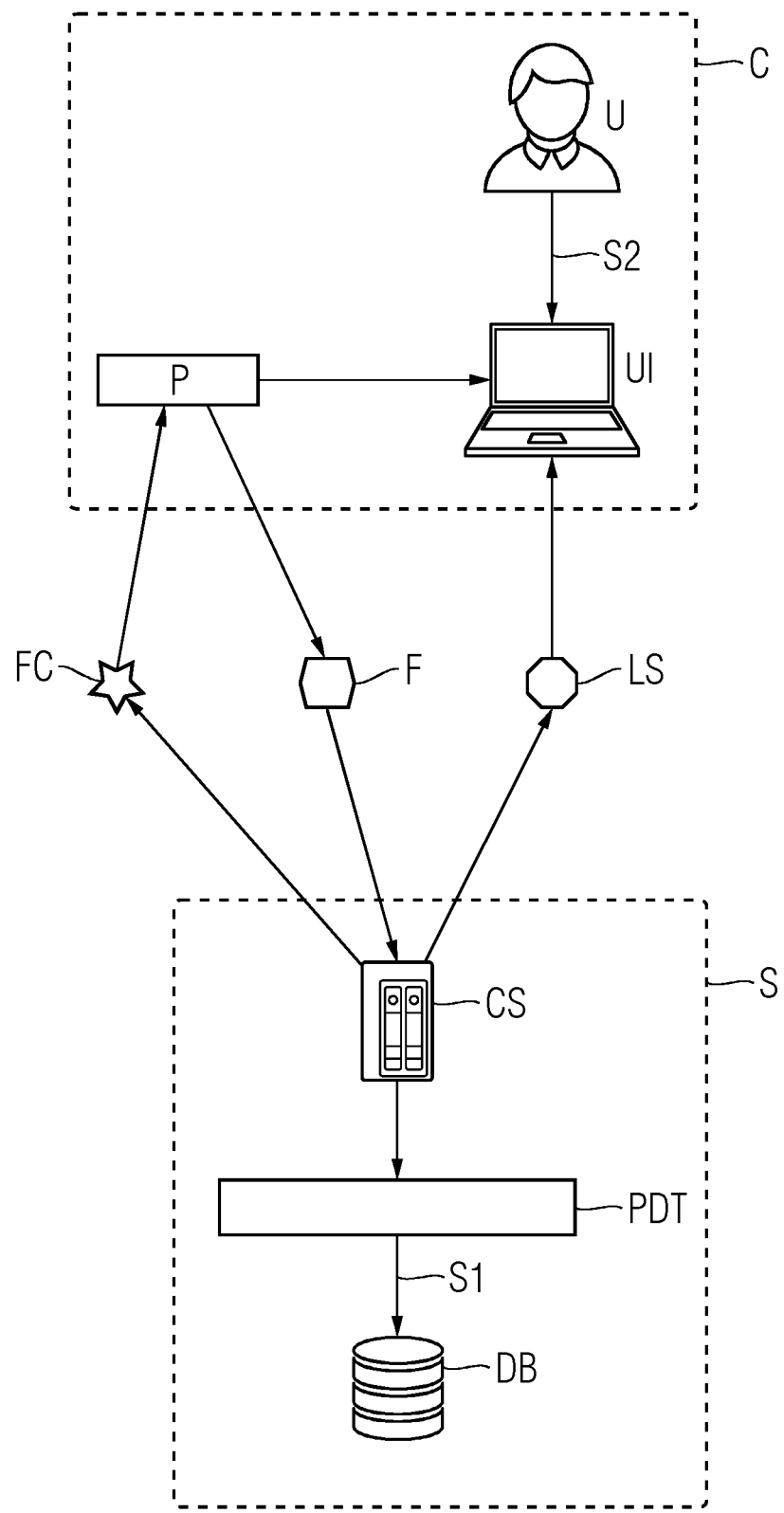

COMPUTER-IMPLEMENTED METHOD AND SYSTEM TO GOVERN STATUS CHECK OF AT LEAST ONE HYPERLINK IN PRESERVATION OF USER'S ANONYMITY OF THE ACCESSED HYPERLINK

FIELD OF TECHNOLOGY

The present invention relates to a computer-implemented method and a system to govern status check of at least one hyperlink in preservation of user's anonymity of the accessed hyperlink.

BACKGROUND

Hyperlinks are used in particular to link a source page and/or document on the Internet (on WEB—World wide Web or on an enterprise intranet) to a target page and/or document. The hyperlinks lead the user from a source page/document to a target page/document. This is typically done in such a way that the user first opens the source page/document with a browser. Clicking on the hyperlink causes the browser to display the target page/document associated with the hyperlink.

The pages/documents can be displayed on a output device e.g. on a display. The user can be a human being or a bot (https://en.wikipedia.org/wiki/Internet_bot).

However, managing and maintaining these hyperlink collections is laborious and time-consuming, since such a collection is subject to constant change. It often happens that hyperlinks set in a source page/document refer to a target page/document that are outdated. Until now, the hyperlinks had to be manually tested to prevent such cases from occurring. Because this is a tedious process, hyperlinks are rarely checked. As a result, however, these collections lose an essential advantageous property, namely the ability to navigate from a stored page/document to another page/document.

To keep the quality of published content on a WEB page, a human user or a bot user employs link checking in order to periodically verify the validity of the hyperlinks. To check the hyperlinks, they must be identified first. Hyperlinks are usually presented to the content reader as text with an underlying hyperlink that can be visited/accessed. The hyperlink needs to be located within the content prior to be able to be checked. Readers of content notify the authors of broken hyperlinks, and broken hyperlinks eventually get deleted or replaced. When content contains only a few hyperlinks, they can be checked by hand. However, if content is large or there are many hyperlinks, this process must be automated.

There are several possible services to check (hyper)links given either a link list or a webpage that is used to extract a list of links. Open-source (OSS) tools such as https://github.com/raviqqe/liche https://github.com/raviqqe/muffet crawl a webpage/-site and extract a link list that is then checked. However, this is not tenable if the website containing hyperlinks is protected by using a non-trivial authentication mechanism.

In view of this, it is an objective of the present invention to present an improved concept or method or system that allows for the distributed privacy preserving link checking.

SUMMARY

The above-mentioned object is achieved by a method and one or more apparatus and/or a system and/or a device according to the features of the independent claims.

Preferred embodiments of the invention are described in the dependent claims. Any combination of the features of the dependent claims to each other and with the features of the independent claims is possible.

The invention claims a computer-implemented method to govern status check of at least one hyperlink in preservation of user's anonymity of the accessed hyperlink, comprising the following method steps:

Providing probabilistic data structure storage, where at least one generated first fingerprint of a hyperlink referring to a WEB object (e.g. (WEB) page/document) accessed by at least one user is stored, whereby each fingerprint is associated with a status ascertained by the user access, Requesting a status check of at least one hyperlink:

Generating a second fingerprint of each hyperlink requested for the status check, matching such a second fingerprint against the at least one first fingerprint, if the matching is successful then the status results in (well-)functioning, otherwise the status results in broken or as unknown functioning, and returning the status on an output device (e.g. display or interface to control device).

In other words, the hyperlink is functioning well if the matching is successful. The status represents working or functioning of the hyperlink. Otherwise the hyperlink is broken. The status represents not working or functioning or unknown.

A probabilistic data structure can be implemented by a Quotient (https://en.wikipedia.org/wiki/Quotient_filter), Bloom (https://en.wikipedia.org/wiki/Bloom_filter) or Cuckoo Filter (https://en.wikipedia.org/wiki/Cuckoo_filter). So fingerprint can be generated via one of these filters. Fingerprints can be encrypted. A matching degree may be designed by the amount of different characters between the matched fingerprints.

The returned status can include a probability of the at least one hyperlink if it is broken or unknown functioning. The returned status can also initiate measures or an alarm message in the case of a broken hyperlink and a warning message in the case of an unknown functioning hyperlink.

The set of hyperlinks to be checked and the set of links represented in the storage are intersected. The secure multiparty computation of the fingerprint or the fingerprint function may involve several round-trips between the system and the storage, depending on the used fingerprint method. A secure multiparty computation of the fingerprint (function) is used to preserve privacy. That means that it is impossible to track the URL (hyperlink) accessed/visited or checked by different or the same user via computing the fingerprint of such URL backwards. The identity of the hyperlink checking user cannot be correlated with the hyperlink.

A further technical benefit to make sure that hyperlinks are functioning is particularly in the case that a computer or other technical system needs to be regularly updated. Hyperlinks often point to at least one software piece for download or to another software information for retrieval in order to be used in subsequent processing. If the hyperlink is broken or mal- or dysfunctioning then the hyperlink refers to a document with content, but the document is not the originally intended document. So a download of the "wrong" document happens and/or a retrieval fails. The subsequent information processing does not happen. This may lead to information loss in the (computer/technical) system.

The invention further claims an implemented method for System suitable to be implemented in a user interface which is configured to govern status check of at least one hyperlink in preservation of user's anonymity of the accessed hyperlink, comprising:
  an interface configured to communicate with a probabilistic data structure storage, where at least one generated first fingerprint of a hyperlink referring to a WEB object accessed by at least one user is stored, whereby each fingerprint can be or is associated with a status ascertained by the user access,
  a unit configured to receive a status check request of at least one hyperlink,
  a fingerprint computation function configured to generate a second fingerprint of each hyperlink requested for the status check,
  whereby the interface is also configured to initiate a matching function configured to match such a second fingerprint against the at least one first fingerprint, wherein the status of requested hyperlink results in functioning if the matching is successful,
  otherwise the status of requested hyperlink results in broken or as unknown functioning, if the, and
  an interface linked with an output device whereby the interface is configured to receive the return of said status.

The status request is usually initiated by a (hyper)link checking user via a browser, preferably by using a hyperlink checking service somewhere in the WEB or a cloud. In said browser a plugin can be installed. Said system can be implemented as such a plugin. In the browser used by the same user or another user accessing/visiting hyperlinks prior to the link checking such a plugin needs to be installed.

The one or more processors can be integrated into the system and interfaces/units and distributed organized on servers or in a cloud.

Embodiments as described above for the system can be analogous applied for the method and for computer program (product) and for the computer-readable storage medium.

This system and the device can be implemented by hardware, firmware and/or software or a combination of them.

The computer-readable storage medium stores instructions executable by one or more processors of a computer, wherein execution of the instructions causes the computer system to perform the method.

The computer program (product) is executed by one or more processors of a computer and performs the method.

BRIEF DESCRIPTION

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. In the figures, identical or functionally identical elements are denoted by identical reference signs. Included in the drawings are the following figures:

The FIGURE illustrates an overview of embodiments of the invention.

DETAILED DESCRIPTION

As used herein, the term "a technical system" refers, for example, to a device, apparatus or a plant. A technical system can, for example, be a field device. Typically, the technical system comprises a plurality of interconnected hardware components and/or software modules. Furthermore, the technical system can, for example, comprise at least one component having a communication interface configured to connect an apparatus/system to an environment, user and/or other system.

Here and in the following, interface, function, storage as well as other units or devices referred to, may for example be software modules of a computer program for carrying out the computer-implemented method. Alternatively, the modules may interact with respective hardware components with software for carrying out the respective steps stored on them.

FIGURE illustrates an example of the invention.

It is possible that there is a Client C and a Server S in communication connection to each other. According to reference sign S2 a user U (browsing user) visits/access a hyperlink (L) or other WEB object e.g. document or file via a browser on his/her User interface UI whereby the hyperlink is either broken (or mal-/dysfunctioning) or working/functioning in a browser with a browser plugin P which is installed on the UI.

The same or another User (checking user) is interested whether the hyperlink L is broken or working and send a request for checking the status LS of the hyperlink L.

The Server S (link checking server) answers the request by returning the status S of hyperlink L. The server included a processing unit CS, which provides a probabilistic data type PDT (see below) stored in a storage/Database DB. The processing also communicates with the plugin P and provides a fingerprint computation/generation (see below).

Plugin P securely computes/generates the fingerprint F of the hyperlink L in such manner that The Server trusts this computation.

According to reference sign S1 the server S stores the status of the links in a storage in form of database DB based on the fingerprints F in a privacy-preserving manner, e.g. in a probabilistic data type PDT, such as a Quotient, Bloom or Cuckoo Filter (with any further improvements in storage or privacy preservation). So, the fingerprint of a hyperlink referring to a WEB object accessed by the user is stored, whereby each such fingerprint is associated with a status ascertained by the user access. Privacy of the browsing and the checking user is protected via the calculation of fingerprints to be transferred to the Server. The Server provides a fingerprint computation (function) FC to the plugin P in a trusted manner (e.g. Secure Multiparty Computation (SMC)). So, the browsing user can trust that FC does not harm the client and does not disclose the fact of having visited/accessed hyperlink L.

The fingerprint calculation shall use a good hash (one-way) function. A fingerprint usually is any function that maps the URL of the hyperlink into another, typically shorter string, however, with the following properties:
  it should be impractical to find the inverse transformation (fingerprint à URL)
  distinct URLs should map onto distinct fingerprints, minimizing "collisions", where two URLs map onto the same fingerprint A fingerprint function FC usually depends on the probabilistic data structure PDT and the chosen secure multiparty computation (SMC) method. In the case of a Bloom Filter as the PDT, the fingerprint is a result of computing several hash functions.

Sets of links LS are checked by the checking user via a his/her UI that requests the server for the status of the links L in the set comprises distinct links L.

Confidentiality of resources (information, downloads) behind links is protected via a link exclusion patterns list (BL) both defined by the browsing user and the administrator of the server. For each link L in a user link checking request, if any of the patterns in a BL matches the URL, the link check status is "excluded".

Confidentiality of the whole set of checked links in the is protected via storing the links in a provided probabilistic data structure PDT. To protect the storage DB from brute-force corruption attempts the number of requests per identifiable user and/or globally can be rate-limited. Segregating the computational part of the server that contains the definition of FC from the DB reduces loss of whole dataset confidentiality in case only either one is exposed.

Encryption at rest may further secure the DB.

Additionally, authentication and an authorization scope are applied to limit malicious requests.

For each stored link the database may store a timestamp. Then it is known when a link was visited the last time. Working links that were visited a long time ago might not be working at the time before the timestamp. This information may be returned to the checking user.

The following designs of the storage/database DB are possible:

A set of two PDT that store the status LS of a link L being either broken (B) in PDTB or working (W) in PDTW:

Here, the status LS returned to the user U via a not shown output device (can be implemented in UI) is as follows according to the matching result of the requested link status LS: For link to be checked a fingerprint F is generated (see above) and for the stored links fingerprints are generated (see above). The matching can return the following result:

if PDTB(F)==yes && PDTW(F)==yes→ambiguous and/or unknown if PDTB(F)==yes && PDTW(F)==no→broken (malfunctioning)

if PDTB(F)==no && PDTW(F)==yes→working ((well-)functioning)

if PDTB(F)==no && PDTW(F)==no→ambiguous and/or unknown

A single PDT that only stores the status that a link is working.

The status S returned to the user via the output device is as follows:

if PDT(F)==yes→working if PDT(F)==no→unknown

The returned status can include a probability of the functioning, mal- or ambiguously/unknown functioning.

To protect potentially unauthorized requests for an authenticated link's status the probability of it being broken or working cannot be calculated and revealed.

The invention has been described in detail with reference to embodiments thereof and examples. Variations and modifications are possible. Instead of the above-described production process one or more processes can analogously be applied to other technical systems.

The system can be (computer-)implemented for performing the inventive method steps.

This system can be a plugin, preferable integrated into a user interface like a (WEB) Browser. It can include one or more processors and can be coupled with data, where said processor(s) is/are configured to execute the method steps.

The method can be executed by at least one processor such as a microcontroller or a microprocessor, by an Application Specific Integrated Circuit (ASIC), by any kind of computer, including mobile computing devices such as tablet computers, smartphones or laptops, or by one or more servers in a control room or cloud.

For example, a processor, controller, or integrated circuit of the system and/or computer and/or another processor may be configured to implement the acts described herein.

The above-described method may be implemented via a computer program (product) including one or more computer-readable storage media having stored thereon instructions executable by one or more processors of a computing system and/or computing engine. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. A processor performs or executes the instructions to train and/or apply a trained model for controlling a system. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

In addition, and alternatively, it is possible that a control device receives other computer-readable control signals in order to initiate the mentioned steering/control process by its processor(s).

The invention has been described in detail with reference to embodiments thereof and examples. Variations and modifications may, however, be effected within the spirit and scope of the invention covered by the claims. The phrase "at least one of A, B and C" as an alternative expression may provide that one or more of A, B and C may be used.

The terminology used herein is for the purpose of describing particular embodiments only and is not intended to be limiting of example embodiments of the invention. As used herein, the singular forms "a", "an", and "the" are intended to include the plural form as well, unless the context clearly indicates otherwise.

It is to be understood that the elements and features recited in the appended claims may be combined in different ways to produce new claims that likewise fall within the scope of the present invention. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

None of the elements recited in the claims are intended to be a means-plus-function element unless an element is expressly recited using the phrase "means for" or, in the case of a method claim, using the phrases "operation for" or "step for".

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method to govern a status check of a hyperlink in preservation of user anonymity, the method comprising:
   providing probabilistic data structure storage, wherein the probabilistic data structure storage stores a status of the hyperlink based on a first fingerprint, wherein the first fingerprint is associated with the hyperlink and with a status of the hyperlink ascertained by a first user access of the hyperlink,
   receiving a request for the status check of the hyperlink from a second user;
   receiving a second fingerprint, wherein the second fingerprint is associated with the hyperlink;
   comparing the second fingerprint against the first fingerprint stored in the probabilistic data structure storage, and based on the comparing, determining whether to output a result of the status check as functioning, broken, or unknown; and
   returning the result of the status check of the hyperlink,
   wherein the first fingerprint does not disclose an identity of the first user and wherein the second fingerprint does not disclose an identity of the second user, and
   wherein the returned result of the status check initiates measures or an alarm message in the case of a broken hyperlink and a warning message in the case of an unknown functioning hyperlink.

2. The method according to claim 1, wherein the wherein the probabilistic data structure storage includes a timestamp indicating when the hyperlink was last visited.

3. A system configured to govern a status check of a hyperlink in preservation of user anonymity, comprising:
   one or more processors configured to:
      communicate with a probabilistic data structure storage, wherein the probabilistic data structure storage stores a status of the hyperlink based on a first fingerprint, wherein the first fingerprint can be or is associated with the hyperlink and with a status of the hyperlink ascertained by a first user access of the hyperlink,
      provide a status check request of the hyperlink,
      generate a second fingerprint wherein the second fingerprint is associated with the hyperlink,
      request a matching function configured to match the second fingerprint against the first fingerprint, wherein the status of the hyperlink is determined based on the matching, and
   an interface linked with an output device whereby the interface is configured to receive the status of the hyperlink determined based on the matching,
      wherein the first fingerprint does not disclose an identity of the first user, and
      wherein the returned result of the status check initiates measures or an alarm message in the case of a broken hyperlink and a warning message in the case of an unknown functioning hyperlink.

4. A computer program product, comprising a computer readable hardware storage device having computer readable program code stored therein, said program code executable by a processor of a computer system to implement the method according to claim 1.

* * * * *